United States Patent Office 2,755,295
Patented July 17, 1956

2,755,295

METHOD OF PREPARING CHLOROSILANES

Arthur F. Gordon, Midland, Mich., assignor to Dow Corning Corporation, Midland, Mich., a corporation of Michigan No Drawing. Application June 3, 1953,
Serial No. 359,420

1 Claim. (Cl. 260—448.2)

This invention relates to a method of preparing phenyltrichlorosilane.

The principal commercial method for preparing phenylchlorosilanes is that of reacting benzene with hydrogen-containing silanes such as trichlorosilane and methyl dichlorosilane. This reaction always produces from 5 to 10 per cent by weight of a residue which consists primarily of complex silanes in which the silicon atoms are linked by phenylene radicals. Since phenylchlorosilanes are in large demand, the amount of residue accumulates rapidly. It represents a rather expensive by-product for which there is no practical use. Furthermore, the continued accumulation of the material poses a storage problem.

It is the object of this invention to provide a method for converting the above residue into phenyltrichlorosilane. Another object is to reduce the cost of the preparation of phenylchlorosilanes by eliminating the residue formed thereby. Other objects and advantages will be apparent from the following description.

This invention relates to a method of producing phenyltrichlorosilane which comprises reacting a silane in which the silicon atoms are linked by phenylene radicals and in which the remaining valences of the silicon are satisfied by chlorine atoms or phenyl radicals, with HCl at a temperature from 100 to 450° C., at a superatmospheric pressure.

When the above reactants are heated at the defined temperatures, cleavage of the phenylene links between the silicon atoms occurs to produce phenyltrichlorosilane. The reaction may be represented schematically as follows:

≡SiC₆H₄Si≡ +HCl→ C₆H₅Si≡ + ≡SiCl

The precise pressure at which the reaction is carried out is not critical provided the pressure is above atmospheric.

The phenylene-linked silanes which are employed in this invention may be represented by the formulae:

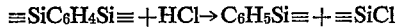

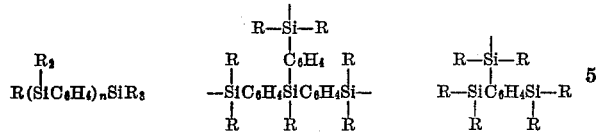

These silanes may range from dimeric materials to complex cross-linked materials which have the consistency of asphalt. For the purpose of this invention, all of the R groups in the silanes can be chlorine atoms or phenyl radicals or some of the R groups can be chlorine atoms with the remainder being phenyl radicals.

The amount of HCl employed relative to the amount of silane is not critical. However, as can be seen from the above reaction, the stoichiometric amount of HCl is one molecule of HCl per phenylene link in the silane. The HCl may be employed in excess of this amount if desired.

Phenyltrichlorosilane is useful as an intermediate in the preparation of phenyl polysiloxane resins.

The following examples are illustrative only and should not be construed as limiting the invention which is properly delineated in the appended claim.

EXAMPLE 1

120.8 parts by weight of the complex residue formed by reacting benzene with trichlorosilane in the presence of boron chloride, which residue was composed primarily of silanes in which the silicon atoms were linked by phenylene radicals, were heated with 17.6 parts by weight HCl at a temperature of 175° C. for 12½ hours at a pressure of from 80 to 100 p. s. i. The reaction product was distilled at atmospheric pressure to remove benzene and then at 175° C. at 25 mm. 28.1 per cent of the distillate obtained under the latter conditions was phenyltrichlorosilane.

EXAMPLE 2

In each of the 3 runs in this example, 600 parts by weight of the residue of Example 1 was mixed with 100 parts by weight benzene in order to render it fluid enough to pour into a 2.4 l. bomb. HCl was then pumped into the bomb until the pressure reached 500 p. s. i. In each run, the bomb was heated at the temperatures shown below for 16 hours.

Table

| Run No. | Temperature in Degrees C. | Percent by Weight C₆H₅SiCl₃ Produced |
|---|---|---|
| 1 | 149-157 | 30.9 |
| 2 | 247-265 | 17.6 |
| 3 | 343-360 | 24.5 |

The yields in each case are based upon the weight of the starting material. In run 1, the yield was determined by distillation analysis while in runs 2 and 3, it was determined by infrared analysis.

That which is claimed is:

A method of producing phenyltrichlorosilane which comprises reacting a chlorosilcarbane in which the silicone atoms are linked by phenylene radicals and in which at least some of the remaining valences of the silicon atoms are satisfied by chlorine atoms, any remaining valences of the silicon atoms being satisfied by phenyl radicals, with HCl at a temperature of from 100 to 450° C., at superatmospheric pressure in the absence of a solvent.

References Cited in the file of this patent

UNITED STATES PATENTS 2,557,782   Clark _____ June 19, 1951

OTHER REFERENCES

Gilman et al.: "Jour. Am. Chem. Soc.," vol. 71 (1949) pages 2066-69.